United States Patent
Snyder et al.

(10) Patent No.: US 9,622,414 B2
(45) Date of Patent: Apr. 18, 2017

(54) DUAL PURPOSE PIVOT ROW CROP TIRE GUARD

(71) Applicant: AGCO Corporation, Hesston, KS (US)

(72) Inventors: Todd B. Snyder, Jackson, MN (US); Jeremiah T. Rau, Brewster, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/856,234

(22) Filed: Sep. 16, 2015

(65) Prior Publication Data

US 2016/0100526 A1    Apr. 14, 2016

Related U.S. Application Data

(60) Provisional application No. 62/063,156, filed on Oct. 13, 2014.

(51) Int. Cl.
| | |
|---|---|
| *B60R 19/00* | (2006.01) |
| *A01D 65/08* | (2006.01) |
| *B62D 25/16* | (2006.01) |
| *B62D 25/18* | (2006.01) |

(52) U.S. Cl.
CPC ........... *A01D 65/08* (2013.01); *B62D 25/168* (2013.01); *B62D 25/182* (2013.01)

(58) Field of Classification Search
CPC ..... A01D 65/08; B62D 25/168; B62D 25/182
See application file for complete search history.

(56) References Cited

U.S. PATENT DOCUMENTS

| | | | |
|---|---|---|---|
| 1,026,293 A | 5/1912 | Adix | |
| 5,075,976 A * | 12/1991 | Young | B27G 19/04 30/391 |
| 2009/0273176 A1 | 11/2009 | Ulgen | |

FOREIGN PATENT DOCUMENTS

| | | |
|---|---|---|
| DE | 1976093 U | 12/1967 |
| DE | 3214901 A1 | 10/1983 |
| EP | 0411262 A1 | 2/1991 |

OTHER PUBLICATIONS

Intellectual Prioperty Office, International Search Report for related UK Application No. GB1419675.2, dated Apr. 13, 2015.

* cited by examiner

*Primary Examiner* — Lori L Lyjak

(57) ABSTRACT

An apparatus is configured for use with a ground-engaging wheel of a device configured to move in a travel direction. The apparatus includes a guard and bracket assembly, wherein the guard is configured to be movable over the wheel. The guard has forward portion, a back portion, and a width substantially covering a width of the wheel. The guard is configured to be movable over the wheel from a first position to a second position. In the first position, the forward portion of the guard is disposed proximate an upper portion of the wheel and the back portion of the guard is disposed proximate a rear portion of the wheel relative to the travel direction. In the second position, the forward portion of the guard is disposed proximate a front portion of the wheel and the back portion of the guard is disposed proximate an upper portion of the wheel.

9 Claims, 3 Drawing Sheets

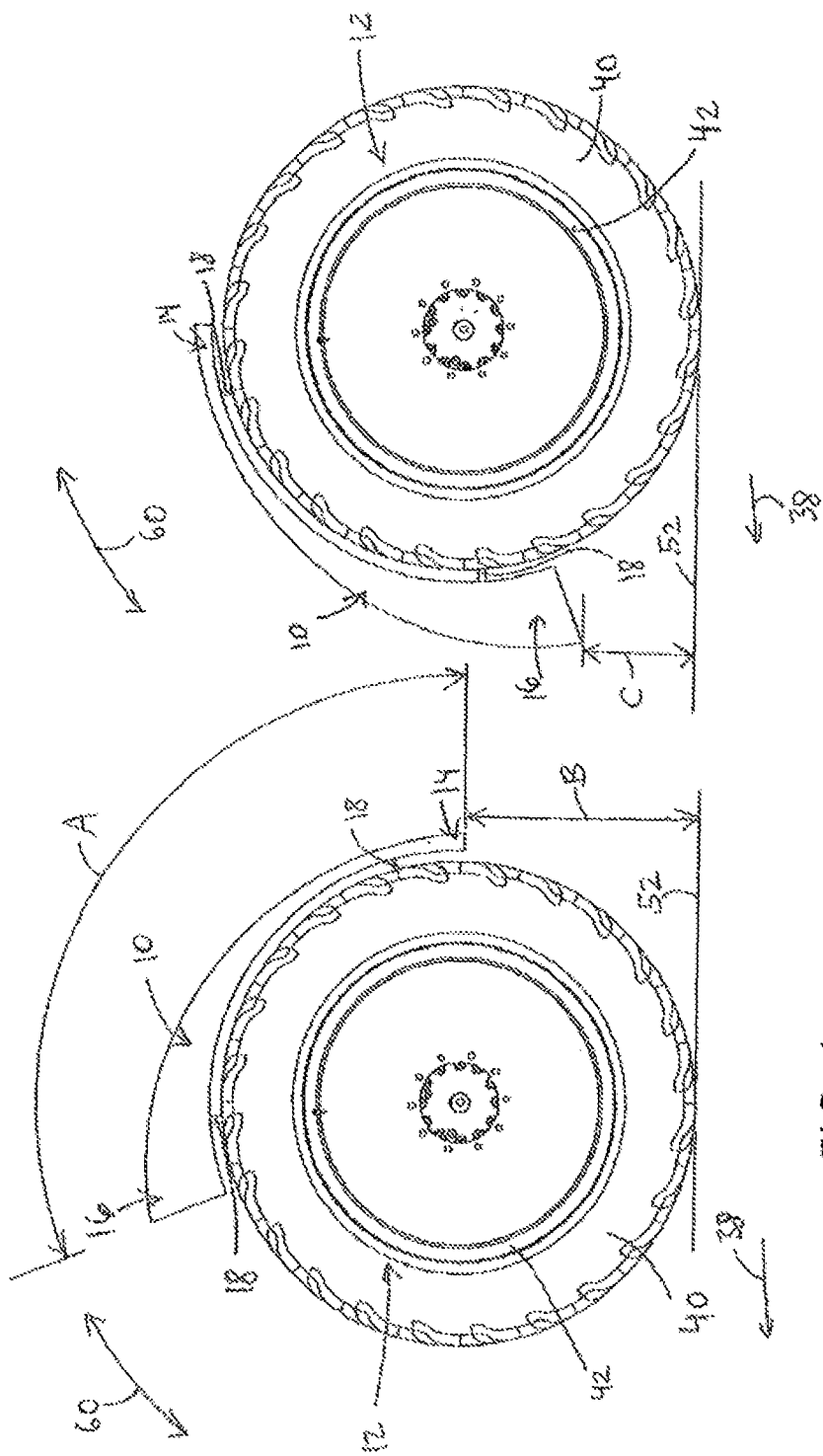

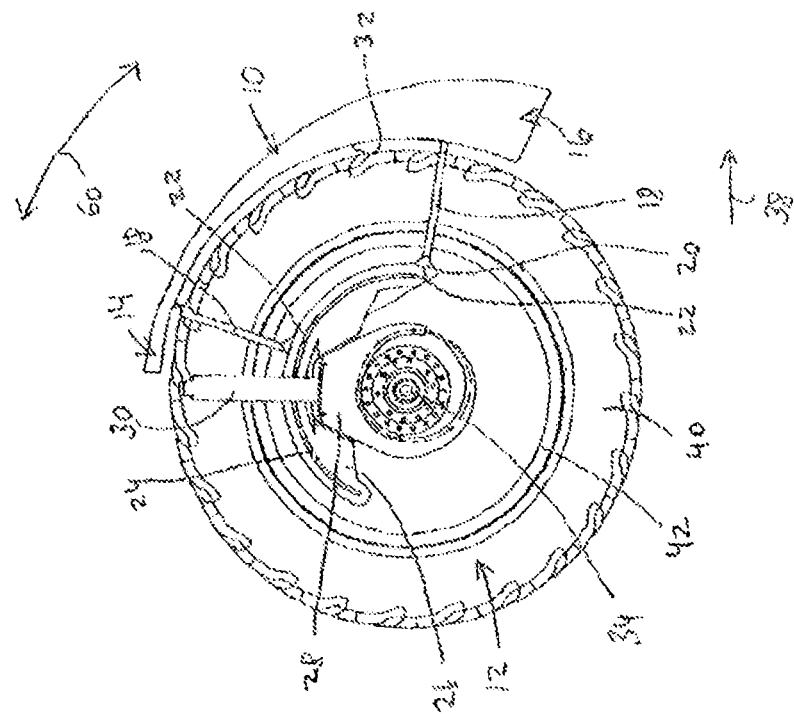

DUAL PURPOSE PIVOT ROW CROP TIRE GUARD

CROSS REFERENCE TO RELATED APPLICATION

This application claims the benefit of U.S. Provisional Application No. 62/063,156, filed Oct. 13, 2014, which is hereby incorporated by reference in its entirety.

BACKGROUND OF THE INVENTION

Field of Invention

This invention relates generally to a tire guard for use with a ground-engaging wheel of a device, such as a vehicle or tractor, configured to move in a travel direction.

Description of Related Art

The plants of certain row crops, such as corn, cotton and soybeans, for example, can branch out and block the aisles between the planted rows when fully matured. For some crops, spacing between rows may be about 15-30 inches, though wide variation is possible. When harvesting machinery enters the field, the tractor proceeds with its wheels placed between the rows. However, the wheels of the tractor can run over and crush the crop that extends into the aisles, resulting in significant crop loss.

Crop shields may be installed on the front side of machine tires to prevent the tires from running over and destroying dense crop growth. The crop shield separates rows of crops and allows each wheel of the machine to pass through the separated vegetation, thereby preventing the tires from becoming entangled with the crops.

Typically, a crop shield is an attachment for a wheel that is positioned at a front of a wheel (with respect to a travel direction of the tractor) and includes a forward pointing configuration for lifting and turning aside stalks that have fallen or are inclined from the planted rows. Thus, the crops will not be run over by the tractor wheels but instead will be pushed aside and lifted into position for cultivation, stalk cutting, harvesting, or other action. However, current crop shields are bulky, heavy and take many hours to install onto an agricultural implement.

OVERVIEW OF THE INVENTION

In one aspect, an apparatus is configured for use with a ground-engaging wheel of a device configured to move in a travel direction. The apparatus comprises a guard and bracket assembly, wherein the guard is configured to be movable over the wheel. The guard has forward portion, a back portion, and a width substantially covering a width of the wheel. The bracket assembly connects the guard to the wheel. The guard is configured to be movable over the wheel from a first position to a second position. In the first position, the forward portion of the guard is disposed proximate an upper portion of the wheel and the back portion of the guard is disposed proximate a rear portion of the wheel relative to the travel direction. In the second position, the forward portion of the guard is disposed proximate a front portion of the wheel relative to the travel direction and the back portion of the guard is disposed proximate an upper portion of the wheel.

In another aspect, a method of using an apparatus is disclosed. The method includes using the apparatus with a ground-engaging wheel of a device configured to move in a travel direction. The method comprises moving the apparatus over the wheel from the first position to a second position. The apparatus comprises a guard and a bracket assembly. The guard has a forward portion, a back portion, and a width substantially covering a width of the wheel. The bracket assembly connects the guard to the wheel. In the first position, the forward portion of the guard is disposed proximate an upper portion of the wheel and the back portion of the guard is disposed proximate a rear portion of the wheel relative to the travel direction. In the second position, the forward portion of the guard is disposed proximate a front portion of the wheel relative to the travel direction and the back portion of the guard is disposed proximate an upper portion of the wheel.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

FIG. 1 is a side elevation view of an outside of a wheel with an exemplary tire guard in a fender position.

FIG. 2 is a side elevation view of an outside of a wheel with an exemplary tire guard in a crop shield position.

FIG. 3 is an inside side elevation view of a wheel with the tire guard in the fender position, as in FIG. 1.

FIG. 4 is an inside elevation view of a wheel with an exemplary tire guard in the crop shield position, as in FIG. 2.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 5:
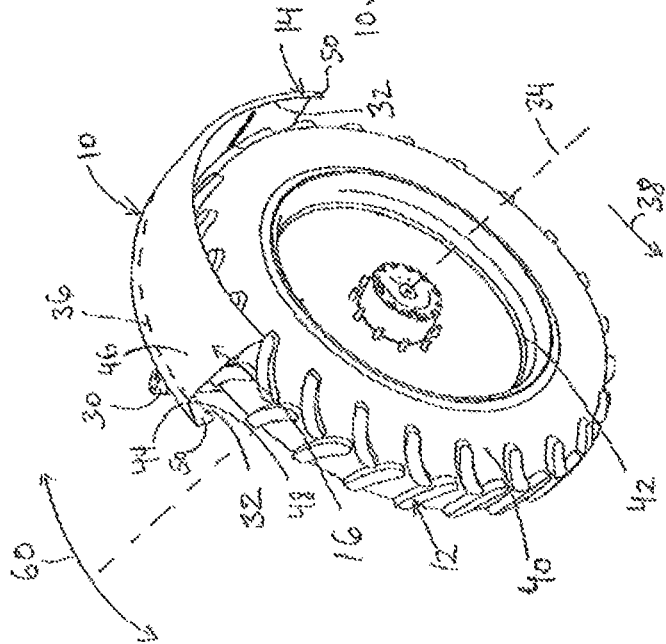
FIG. 5 is an outside front perspective view of the exemplary tire guard in the fender position, as in FIGS. 1 and 3.

The present disclosure is directed to a dual purpose tire guard that allows an operator to move the tire guard over the wheel, such as by a pivoting motion, for example, between a fender position and a crop shield position. The disclosed tire guard is configured for use with a ground-engaging wheel of a device, such as a vehicle or tractor, configured to move in a travel direction. FIGS. 1, 3 and 5 show an exemplary tire guard 10 mounted on a wheel 12, in an upward or fender position. Such a tire guard 10 may be formed of rubber, plastic, metal or a combination thereof. In an exemplary embodiment, tire guard 10 at back portion 14 is relatively flat and follows a contour of wheel 12. In an exemplary embodiment, tire guard 10 follows an arcuate curve away from wheel 12 as it forms a pointed forward portion 16. As shown in the fender position of FIGS. 1, 3 and 5, tire guard 10 prevents mud, rocks and other debris from being picked up by the wheel 12 and thrown upward onto the agricultural implement.

Figure 6:
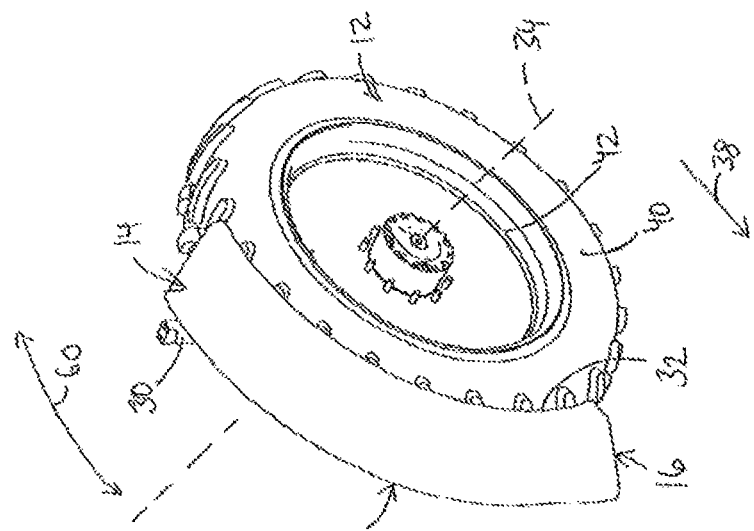
FIG. 6 is an outside front perspective view of an exemplary tire guard in the crop shield position, as in FIGS. 2 and 4.

FIGS. 2, 4 and 6 show tire guard 10 moved forward on wheel 12 into a crop shield position. In this positon, the agricultural implement may be driven forward through a field of row-planted crops, wherein tire guard 10 separates the crops growing between the rows and lifts fallen stalks into a more upright position. As wheel 12 travels in the forward travel direction indicated by arrow 38, the pointed surface of forward portion 16 of tire guard 10 contacts the crops. Center line 36 runs along a length of tire guard 10 from peak 48 of forward portion 16 and separates first side 44 and second side 46 (shown in FIG. 5). To form a point at peak 48, the angle between first side 44 and second side 46 is less than 180 degrees. The contacted plant matter follows tire guard 10 outward and upward and along each side 44, 46. Thus, the plant stalks are separated and lifted, thereby preventing wheel 12 from crushing them. It is contemplated that forward portion 16 may possess a configuration that is more or less pointed than illustrated in FIGS. 5 and 6. In an exemplary embodiment, tire guard 10 at back portion 14 has a substantially flat surface over the width of wheel 12, with side flanges 50 extending downward from the substantially flat surface, toward lower edge 32. As illustrated, in an exemplary embodiment, the shape of tire guard 10 includes a smooth arc along center line 36 between forward portion 16 and back portion 14.

As shown in FIGS. 3 and 4, in an exemplary embodiment, tire guard 10 is attached to wheel 12 by a bracket assembly including brackets 18, plate 20 and plate 26. In an exemplary embodiment, plate 20 includes members such as pins 22 configured to engage with and slide in arcuate channel 24 of plate 26. In an exemplary embodiment, plate 26 is fixedly mounted on motor housing 28 and/or wheel leg 30 of wheel 12. Motor housing 28 and wheel leg 30 are attached to a steering arm and/or axle of the agricultural implement, as conventionally known.

Tire guard 10 has a width that substantially covers a width of wheel 12, as shown in FIGS. 5 and 6. In an exemplary embodiment, when tire guard 10 is in the fender position as show in FIGS. 1, 3 and 5, the forward portion 16 of the tire guard 10 is disposed proximate an upper portion of the wheel 12 and the back portion 14 of the tire guard 10 is disposed proximate a rear portion of the wheel 12 relative to the travel direction 38.

Tire guard 10 may be slid via pins 22 and arcuate channel 24 to the crop shield position shown in FIGS. 2, 4 and 6. In this position, the forward portion 16 of the tire guard 10 is disposed proximate a front portion of the wheel 12 relative to the travel direction 38 and the back portion 14 of the tire guard 10 is disposed proximate an upper portion of the wheel 12. While exemplary positions of tire guard 10 are illustrated and shown, it is contemplated that tire guard 10 may be positioned differently than shown. Moreover, while a particular configuration of tire guard 10 is illustrated with respect to wheel 12, it is contemplated that tire guard 10 may have a length and/or configuration different than that shown. In an exemplary embodiment, wheel 12 includes tire 40 installed onto rim 42.

In an exemplary embodiment, lower edge 32 of each flange 50 possesses a contour that substantially follows that of tire 40, while allowing a clearance gap to prevent binding of tire guard 10 on tire 40, even with accumulation of mud, dirt, vegetation, or other debris. Thus, in an exemplary embodiment, brackets 18 serve to support tire guard 10 in a position so that lower edge 32 and the rest of tire guard 10 are spaced from a tread of tire 40.

Following are exemplary dimensions for a tire guard 10 used with a tire 40 having a size code of 380180R42. Such a tire 40 has a tire section width of 380 mm; an aspect ratio (percentage of sidewall height to section width) of 80; Radial construction; a diameter of rim 42 of about 1.07 m (42 inches); and an overall diameter of about 1.69 m (66.6 inches). For such a tire 40, a particularly suitable tire guard 10 has approximate dimensions as follows: width of about 420 mm, with a range from about 345 mm to about 495 mm; angular sweeping arc "A" between back portion 14 and forward portion 16 of about 115 degrees, with a range from about 85 degrees to about 145 degrees; inner radius (distance from axis 34 to lower edge 32) of about 890 mm, with a range from about 840 mm to about 940 mm; outer radius (distance from axis 34 to center line 36 at forward portion 16) of about 1175 mm, with a range from about 825 mm to about 1525 mm; at the front portion 16, the two sides 44, 46 meet at peak 48 at an angle of about 90 degrees, with a range from about 40 degrees to about 140 degrees; and a radius of curvature of peak 48 is about 50 mm, with a range from about 10 mm to about 90 mm. In the illustrated embodiment, distance "B" in FIG. 1 between back portion 14 and ground surface 52 is about 845 mm to about 915 mm and distance "C" in FIG. 2 between forward portion 16 and ground surface 52 is about 305 mm to about 410 mm. It is contemplated that all dimensions may be different than shown and described, especially when different tire sizes are used.

Suitable materials for tire guard 10 include plastic (for example, polyethylene having a thickness of about 3-8 mm), composite materials (including many options, such as fiber-glass having a thickness of about 3-8 mm), metals such as steel or aluminum (formed by means such as stamping or deep-drawing, for example, and having a thickness of about 16 GA to about 30 GA) and rubber or other resilient materials. Brackets 18 and plates 20, 26 may be made of materials such as steel, aluminum, stainless steel, or cast iron, for example. Brackets 18 may be in the form of bent sheet metal, square or round tubes, a combination thereof, or other forms.

The disclosed dimensions and materials are exemplary and not to be construed as limiting. Moreover, it is contemplated that tire guards having other dimensions are suitable for tires of different sizes.

Movement of tire guard 10 from the fender position shown in FIGS. 1, 3 and 5 to the crop shield position shown in FIGS. 2, 4 and 6 can be accomplished by means including manual actuation or automatic actuation by electrical or hydraulic means, for example. Moreover, a latch, detent, or other lock mechanism can be used to retain tire guard 10 in the desired position.

In an exemplary embodiment, the movement of tire guard 10 between the fender position and the crop shield position is essentially a pivoting motion about the rotation axis 34 of wheel 12 (such as along arc arrow 60). This is accomplished in the exemplary illustrated embodiment by configuring arcuate channel 24 as a portion of a circle that is concentric with rotation axis 34. Moreover, a distance between lower edge 32 to pin 22 (perpendicular to the tangent of the circle including arcuate channel 24) is the same at each pin 22.

When tire guard 10 is not required in the crop shield position as shown in FIGS. 2, 4 and 6, tire guard 10 can be pivoted back to the fender position shown in FIGS. 1, 3 and 5. Thus, tire guard 10 remains on the vehicle at all times and eliminates the task for personnel of installing a crop shield when needed and removing the crop shield when not needed.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. An apparatus configured for use with a ground-engaging wheel of a device configured to move in a travel direction, the apparatus comprising:
   a guard having forward portion, a back portion, and a width substantially covering a width of the wheel; wherein the guard comprises a center line along a length of the guard, and wherein two sides of the guard meet at the forward portion of the guard at a peak along the center line having an angle less than 180 degrees; and
   a bracket assembly connecting the guard to the wheel;
   wherein the guard is configured to be movable over the wheel:
      from a first position, wherein the forward portion of the guard is disposed proximate an upper portion of the wheel and wherein the back portion of the guard is disposed proximate a rear portion of the wheel relative to the travel direction;
      to a second position, wherein the forward portion of the guard is disposed proximate a front portion of the wheel relative to the travel direction and wherein the back portion of the guard is disposed proximate an upper portion of the wheel.

2. The apparatus of claim 1 wherein the guard is configured to pivot about the wheel.

3. The apparatus of claim 1 wherein the bracket assembly comprises a plate comprising an arcuate channel.

4. The apparatus of claim 3 wherein the arcuate channel comprises a portion of a circle that is concentric with a rotation axis of the wheel.

5. The apparatus of claim 3 wherein the bracket assembly further comprises a plurality of members slidably engaged with the arcuate channel.

6. A method of using an apparatus with a ground-engaging wheel of a device configured to move in a travel direction, the method comprising:
   moving the apparatus over the wheel from the first position to a second position, wherein the apparatus comprises:
   a guard having forward portion, a back portion, and a width substantially covering a width of the wheel; wherein the guard comprises a center line along a length of the guard, and wherein two sides of the guard meet at the forward portion of the guard at a peak along the center line having an angle less than 180 degrees; and
   a bracket assembly connecting the guard to the wheel;
   wherein in the first position, the forward portion of the guard is disposed proximate an upper portion of the wheel and wherein the back portion of the guard is disposed proximate a rear portion of the wheel relative to the travel direction; and
   wherein in the second position, wherein the forward portion of the guard is disposed proximate a front portion of the wheel relative to the travel direction and wherein the back portion of the guard is disposed proximate an upper portion of the wheel.

7. The method of claim 6 wherein moving the apparatus over the wheel comprises pivoting the guard about the wheel.

8. The method of claim 7 wherein pivoting the guard about the wheel comprises pivoting about a rotation axis of the wheel.

9. The method of claim 6 wherein moving the apparatus over the wheel comprises sliding a member within an arcuate channel of the bracket assembly.

* * * * *